(12) United States Patent
Hayashi et al.

(10) Patent No.: US 8,054,024 B2
(45) Date of Patent: Nov. 8, 2011

(54) BRUSHLESS MOTOR

(75) Inventors: Shigeo Hayashi, Kyoto (JP); Yosuke Kawano, Kyoto (JP); Satoshi Komatsu, Kyoto (JP)

(73) Assignee: Nidec Corporation, Kyoto (JP)

( * ) Notice: Subject to any disclaimer, the term of this patent is extended or adjusted under 35 U.S.C. 154(b) by 452 days.

(21) Appl. No.: 12/328,001

(22) Filed: Dec. 4, 2008

(65) Prior Publication Data

US 2009/0146598 A1    Jun. 11, 2009

(30) Foreign Application Priority Data

Dec. 6, 2007    (JP) .................................. 2007-315785

(51) Int. Cl.
*H02P 6/18*    (2006.01)
(52) U.S. Cl. .............. 318/400.34; 318/700; 318/400.01; 318/459; 388/923; 388/928.1; 361/236; 361/240
(58) Field of Classification Search ............. 318/400.34, 318/459, 400.01, 700; 388/923, 928.1; 361/236, 361/240
See application file for complete search history.

(56) References Cited

U.S. PATENT DOCUMENTS

| 7,166,975 B2 * | 1/2007 | Mori et al. ............... 318/400.36 |
| 2004/0251860 A1 * | 12/2004 | Ehsani et al. ................. 318/254 |

FOREIGN PATENT DOCUMENTS

| JP | 2000-253692 A | 9/2000 |
| JP | 3599547 B2 | 12/2004 |
| JP | 3599574 B2 | 12/2004 |
| JP | 2005-27395 A | 1/2005 |
| JP | 2006-230120 A | 8/2006 |
| KR | 2006-0086613 A | 8/2006 |

* cited by examiner

*Primary Examiner* — Rita Leykin
(74) *Attorney, Agent, or Firm* — Keating & Bennett, LLP

(57) ABSTRACT

A brushless motor driven by a sensorless driving circuit includes a rotating body capable of being rotated about a center axis; a rotor magnet arranged coaxially with the rotating body; a stator disposed opposite the rotor magnet; and at least one coil wound around the stator. The brushless motor is driven according to a signal containing a third harmonic component relative to a fundamental wave component in an induced electromotive force. Further, an amplitude ratio of the third harmonic component to the fundamental wave component in the induced electromotive force generated in the coil preferably is about 1% or higher.

14 Claims, 9 Drawing Sheets

BRUSHLESS MOTOR

BACKGROUND OF THE INVENTION

1. Field of the Invention

The present invention relates to a motor driven by a sensorless driving circuit.

2. Description of the Related Art

Conventionally, a brushless motor has been driven by a pulse width modulation (PWM) method using an inverter mainly for achieving a wide range of variable speed control and reduction in current consumption. A brushless motor with a 3-phase coil, for example, has position sensors (such as Hall elements) arranged at an interval of 120 electrical degrees to detect a rotor magnetic pole position. Based on a signal corresponding to the magnetic pole position obtained by those position sensors, the brushless motor executes a near-sinusoidal wave driving by operating each switching element in the inverter device.

Further, diverse sensorless driving techniques have been developed for reducing the cost and size of a brushless motor by omitting position sensors. One way to achieve such a sensorless driving employs a 120-degree conduction scheme or a wide angle (less than 180 degrees) conduction scheme to detect a zero-crossing point of an electromotive force generated during a non-conducting period. Therefore, in these conduction schemes, each phase is required to have a non-conducting period for detecting a magnetic pole position. Unfortunately though, the existence of the non-conducting period may cause vibration and noise at the timing of commutation.

In view of this, a near-sinusoidal wave sensorless driving recently has been developed to reduce vibration and noise by eliminating the necessity of the non-conducting period (one example of the near-sinusoidal wave sensorless driving that does not require a non-conducting period is disclosed in Japanese Patent Application Publication No. 2006-230120).

In the above technique, the near-sinusoidal wave sensorless driving makes use of a superimposed voltage of 3Nth (where N is a positive integer) harmonic components contained in an induced electromotive force to detect a magnetic pole position without introducing the non-conducting period. Therefore, if the induced electromotive force is reduced by a low-speed rotation, or if an amplitude ratio of the 3Nth harmonic components to the fundamental wave component is extremely small, it is difficult to detect a magnetic pole position with a high accuracy.

SUMMARY OF THE INVENTION

In view of the above, preferred embodiments of the present invention provide a brushless motor capable of achieving a high accuracy detection for a magnetic pole position while using a near-sinusoidal sensorless driving.

In accordance with one preferred embodiment of the present invention, a brushless motor driven by a sensorless driving circuit includes a rotating body capable of being rotated about a center axis; a rotor magnet arranged coaxially with the rotating body; a stator disposed opposite the rotor magnet; and at least one coil wound around the stator. Herein, the brushless motor is driven according to a signal containing a third harmonic component relative to a fundamental wave component in an induced electromotive force. Further, an amplitude ratio of the third harmonic component to the fundamental wave component in the induced electromotive force generated in the coil preferably is about 1% or higher.

In accordance with another preferred embodiment of the present invention, a brushless motor includes a rotating body having a rotor magnet arranged coaxially with a center axis, capable of being rotated about the center axis; and a fixed body having a stator disposed opposite the rotor magnet and a sensorless driving circuit configured to control a rotation of the rotating body by controlling a current conduction in a coil in the stator. Herein, the sensorless driving circuit includes a position detector configured to detect a position of the rotating body based on an induced electromotive force generated in the coil by the rotor magnet rotating about the stator; a controller configured to control a conduction timing according to the detected position of the rotating body received from the position detector; and a motor driving unit configured to convert a current conduction in the coil in response to a control signal from the controller.

Further, the position detector detects a position of the rotating body using a signal containing a third harmonic component relative to a fundamental wave component in the induced electromotive force. Furthermore, an amplitude ratio of the third harmonic component to the fundamental wave component in the induced electromotive force preferably is about 1% or higher.

In accordance with various preferred embodiments of the present invention, a brushless motor can be stably rotated by a sensorless driving circuit by setting a constituent ratio of a third harmonic component with respect to a fundamental wave component in an induced electromotive force to be about 1% or higher. Further, in various preferred embodiments of the present invention, the sensorless driving circuit may be located outside of the brushless motor.

In the above, a magnetic flux density on a side surface of the rotor magnet may be distributed in a near-sinusoidal waveform with respect to a rotation angle, the waveform having a concave portion at a center of a magnetic pole.

According to this configuration, a concave portion exists at the center of a magnetic pole in the waveform of magnetic flux density on a side surface of a rotor magnet, so that the third harmonic component in the induced electromotive force is increased in magnitude relative to the fundamental wave component therein. Therefore, the brushless motor can be rotated more stably by the sensorless driving circuit.

In the above, a rate of variation of a coil inductance equal to a ratio of a difference between a maximum coil inductance value and a minimum coil inductance value to the maximum coil inductance value preferably may be about 10% or higher.

According to this configuration, the rate of variation in the coil inductance preferably is about 10% or higher, so that a magnitude of the induced electromotive force can be increased. Therefore, the brushless motor can be rotated stably at a relatively low speed (e.g., about 40 rpm) as well.

In the above, the stator may include tooth portions extending in a radial direction with respect to the center axis, and arranged at a regular interval in a circumferential direction, wherein each of the tooth portions has a widened portion arranged opposite the rotor magnet, and a base portion extending from the widened portion in a radially inward direction, wherein the widened portion includes a counter surface whose circumferential width is larger than that of the base portion, and an inner surface arranged radially opposite the counter surface and extending from a side surface of the base portion, and wherein a ratio of D1 to R1 preferably is about 0.92 or smaller, for example, R1 being a distance between the center axis and a position of the counter surface closest to the rotor magnet, and D1 being a distance between the center axis and the inner surface.

According to this configuration, a D1/R1 value preferably is about 0.92 or smaller, so that the rate of variation in the coil inductance can be made to vary according to a change in the magnetic flux density at the magnetic pole of the rotor magnet. Therefore, the brushless motor can be configured to be rotated more stably by the sensorless driving circuit.

In the above, the circumferential width of the base portion may vary along the radial direction, wherein a ratio of Wmin to Wmax preferably is about 0.7 or larger, for example, Wmax being a maximum circumferential width of the base portion, and Wmin being a minimum circumferential width of the base portion.

According to this configuration, a Wmin/Wmax value preferably is approximately 0.7 or greater, for example, so that the rate of variation in the coil inductance can be made to vary according to a change in the magnetic flux density at the magnetic pole of the rotor magnet. Therefore, the brushless motor can be configured to be rotated more stably by the sensorless driving circuit.

In the above, the sensorless driving circuit may be disposed on a circuit board that forms at least a portion of the rotating body.

According to this configuration, the sensorless driving circuit is disposed on the circuit board of the fixed body in the brushless motor, so that an additional circuit board other than that in the brushless motor is not required for installing the sensorless driving circuit. Therefore, a device having the brushless motor installed therein can be reduced in size.

In the above, the rotating body includes a disk support portion on which a disk having a central opening is mounted; and a chucking device configured to enable the disk to be attached thereto and detached therefrom.

According to this configuration, it is possible to provide a highly reliable brushless motor capable of being stably rotated even in case a disk is rotated directly by the brushless motor.

In accordance with still another preferred embodiment of the present invention, there is provided a disk driving apparatus, equipped with the brushless motor according to any of the above-described preferred embodiments, capable of driving a disk. The disk driving apparatus includes an optical pickup mechanism configured to emit and receive light to and from the disk; and a moving mechanism configured to move the optical pickup mechanism in a radial direction of the disk.

According to this configuration, it is possible to provide a highly reliable disk driving apparatus capable of reducing vibration and noise while suppressing an error generation in recording and playing.

In accordance with various preferred embodiments of the present invention, it is possible to provide a brushless motor capable of detecting a magnetic pole position with high accuracy while being operated by a near-sinusoidal sensorless driving.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Overall Configuration of Brushless Motor

Figure 1:
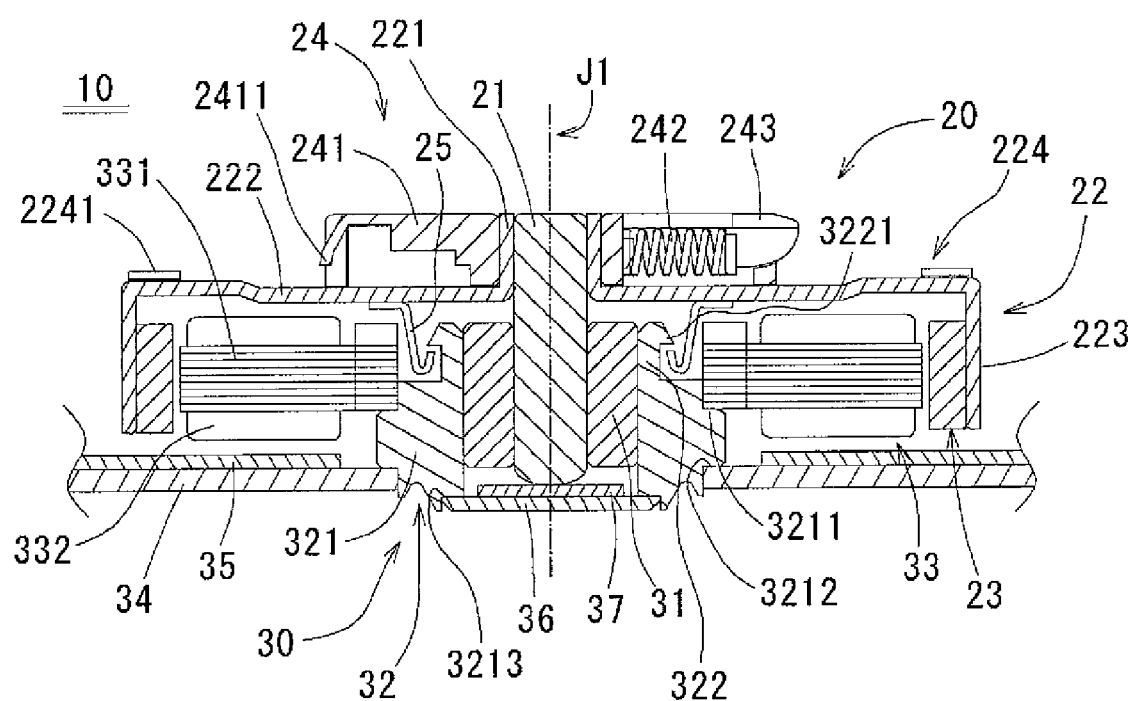
FIG. 1 is a schematic cross-sectional view of a brushless motor taken in an axial direction in accordance with a preferred embodiment of the present invention.
Figure 2:
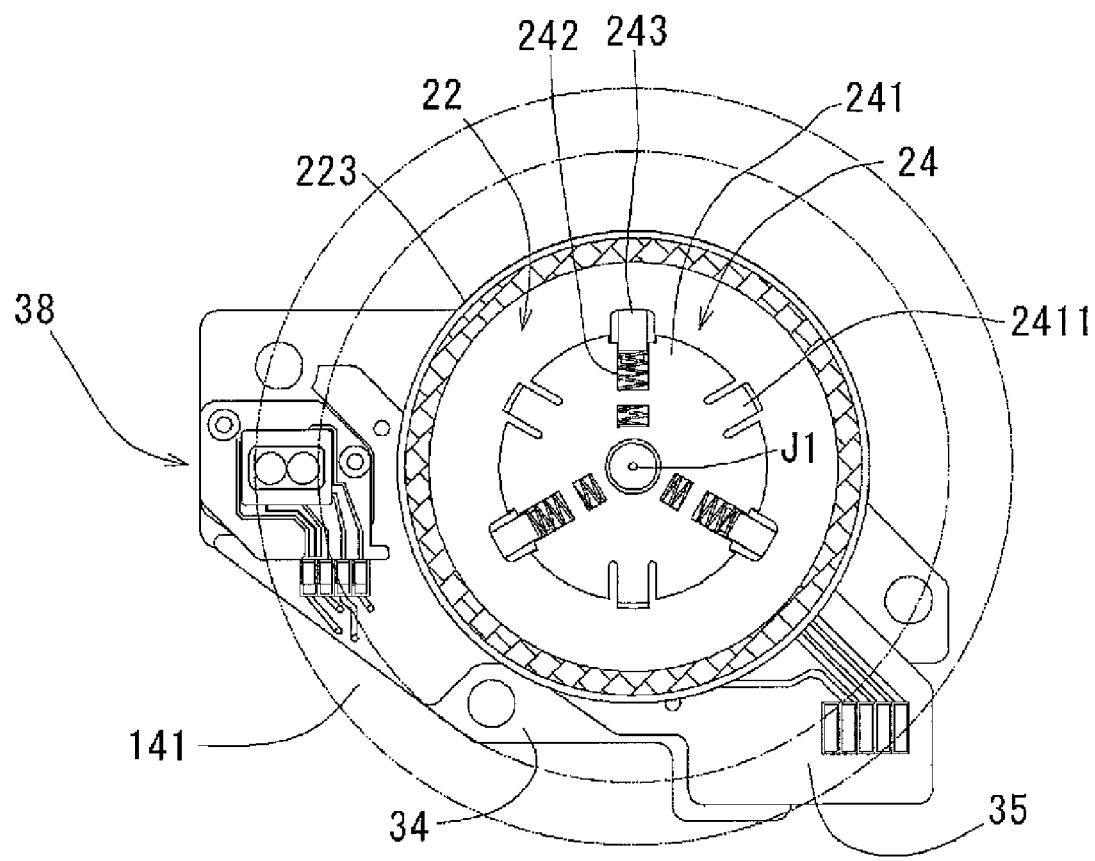
FIG. 2 is a schematic top plan view of the brushless motor shown in FIG. 1.

A brushless motor in accordance with a preferred embodiment of the present invention will now be described with reference to FIGS. 1 and 2. FIG. 1 is a cross-sectional view of the brushless motor taken in an axial direction in accordance with a preferred embodiment of the present invention, and FIG. 2 is a top plan view of the brushless motor shown in FIG. 1.

As shown in FIG. 1, a brushless motor 10 includes a rotating body 20 having a rotor magnet 23 rotating about a center axis J1; and a fixed body 30 having a stator 33 with a side facing the rotor magnet 23 in a radial direction. The brushless motor 10 preferably is a 3-phase spindle drive motor that is configured to rotate an optical disk such as a CD or DVD about the center axis J1, for example.

First, details of the rotating body 20 will be provided below. The rotating body 20 is provided with a shaft 21 arranged coaxially with the center axis J1; a rotor holder 22 fixed to the shaft 21; a rotor magnet 23 fixed to the rotor holder 22; and a chucking device 24 arranged at a top portion of the rotor holder 22.

The rotor holder 22 includes a roughly cylindrical shaft holding portion 221 that is fixed to an outer circumferential surface of the shaft 21; a planar cover portion 222 that extends in the radial direction from an axially lower portion of the shaft holding portion 221; and a cylindrical portion 223 that extends from an outer periphery of the cover portion 222 in an axially downward direction. Fixed to an inner circumferential surface of the cylindrical portion 223 is the rotor magnet 23 preferably having a roughly cylindrical shape. In the present preferred embodiment, the rotor magnet 23 in the brushless motor 10 has, for example, 16 magnetic poles. Further, a neodymium magnet made of a compound of neodymium (Nd), iron (Fe) and boron (B) is preferably used for the rotor magnet 23.

Further, a planar disk support portion 224 preferably formed by bending the cover portion 222 in an axially upward direction and arranged parallel or substantially parallel to the cover portion 222 is located radially outward of the cover portion 222 in the rotor holder 22. Further, a ring-shaped disk support surface 2241 preferably made of rubber is located radially outward of the disk support portion 224.

The chucking device 24 is fixed to an outer circumferential surface of the shaft holding portion 221 in the rotor holder 22, and includes a center casing 241 that is to be brought into contact with a central opening of a disk (not shown); coil springs 242 (three coil springs are shown in the illustrated embodiment of FIG. 2) held in the center casing 241; and chuck claws 243 (three chuck claws are shown in the illustrated example of FIG. 2) on which the coil springs 242 impose a force in an radially outward direction. The chuck claws 243 hold the disk by making contact with an upper periphery around a central opening of the disk. Further, aligning claws 2411 (three aligning claws are shown in the illustrated example of FIG. 2) are formed as a united body with the center casing 241 to align a center of the central opening with the center axis J1 by making contact with a portion around the central opening in the disk.

Next, the fixed body 30 will be explained in detail.

The fixed body 30 is provided with a roughly cylindrical sleeve 31 having an inner circumferential surface to support the shaft 21 rotatably in the radial direction; a housing 32 having an inner circumferential surface to support the outer circumferential surface of the sleeve 31; a stator 33 fixed to the housing 32; an attachment plate 34 fixed to the housing 32 and disposed axially lower than the stator 33; a circuit board 35 fixed to a top surface of the attachment plate 34; a disk-shaped plate 36 fixed to the housing 32 for covering an axially lower area of the inner circumferential surface of the housing 32; and a thrust plate 37 disposed on a top surface of the plate 36.

The housing 32 includes a base portion 321 for fixing the stator 33; and a cylindrical portion 322 of a roughly cylindrical shape that extends in an axially upward direction from the base portion 321. An inner circumferential surface of the housing 32 includes an inner circumferential surface of the base portion 321 and that of the cylindrical portion 322.

The stator 33 is fixed to a first outer peripheral portion 3211 formed on an upper surface portion of the base portion 321. Further, the attachment plate 34 is fixed to a second outer peripheral portion 3212 formed on a lower portion of the base portion 321. Further, the plate 36 is fixed to an inner peripheral portion 3213 formed on a lower portion of the base portion 321.

Further, on an axially upper portion of the cylindrical portion 322 in the housing 32 is formed an engaging portion 3221 projecting in the radially outward direction and formed as a united body with the cylindrical portion 322. An outer circumferential surface of the engaging portion 3221 has a slanted surface inclined axially downward in the radially outward direction. Further, a removal prevention member 25 is fixed to a bottom of the cover portion 222 in the rotor holder 22. With the help of the engaging portion 3221 and the removal prevention member 25, the rotating body 20 is prevented from moving in the axially upward direction.

The stator 33 includes a stator core 331 having thin magnetic plates stacked in the axial direction; and coils 332 formed by winding conductive wires around the stator core 331. An outer circumferential surface of the stator core 331 is arranged to radially face an inner circumferential surface of the rotor magnet 23. The coils 332 (collectively referred to as a winding) have three phases (referred to as U-phase, V-phase and W-phase), and are connected to each other in Y connection. Specifically, among the coils 332, a group of coils 332 corresponding to U-phase is denoted by Lu, that corresponding to V-phase is denoted by Lv, and that corresponding to V-phase W-phase is denoted by Lw (see FIG. 3).

By conducting a current in the coils 332, the stator 33 generates a magnetic field. As the rotor magnet 23 and the stator 33 form a rotating magnetic field, a rotational torque is generated about the center axis J1, and thus the rotating body 20 is rotated.

In addition, a position detecting unit 38 (see FIG. 2), which optically reads data from a pattern-formed portion 141 located on a label side that is a rear side of a disk (not shown), is installed at the attachment plate 34 radially outside of the rotating body 20. In case of drawing characters or pictures on the label side of the disk, the rotating body 20 is preferably controlled to be rotated at a low speed (e.g., about 40 rpm) according to information provided by the position detecting unit 38. Here, the position detecting unit 38 is, for example, a photosensor.

Configuration of Near-sinusoidal Sensorless Driving Circuit

Next, an overall configuration of a near-sinusoidal sensorless driving circuit will be explained with reference to FIG. 3, which is a circuit diagram showing an overall configuration of the near-sinusoidal sensorless driving circuit used for driving the brushless motor in accordance with a preferred embodiment of the present invention. Here, the near-sinusoidal sensorless driving circuit corresponds to the term "sensorless driving circuit" recited in the claims.

The near-sinusoidal sensorless driving circuit 4 is disposed on the circuit board 35. Since the brushless motor 10 and the near-sinusoidal sensorless driving circuit 4 are not formed as separate parts, an additional circuit board other than the circuit board 35 is not necessary for installing the near-sinusoidal sensorless driving circuit 4. As a result, an apparatus (e.g., a disk driving apparatus) equipped with the brushless motor 10 can be reduced in size.

Figure 3:
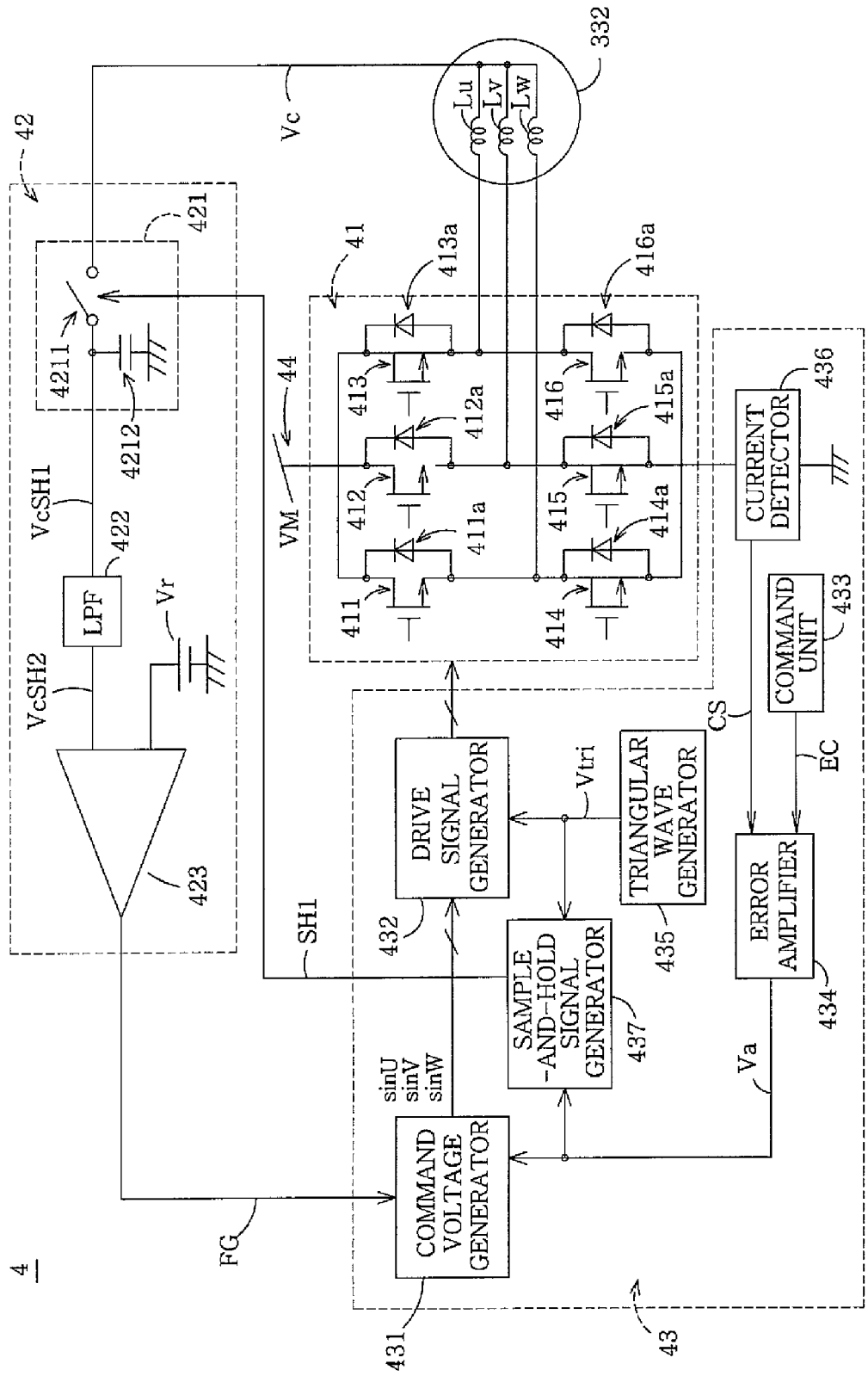
FIG. 3 is a circuit diagram of a near-sinusoidal sensorless driving circuit in the brushless motor in accordance with a preferred embodiment of the present invention.

As shown in FIG. 3, the near-sinusoidal sensorless driving circuit 4 includes a motor driving unit 41, a magnetic pole position detector 42, and a controller 43.

The motor driving unit 41, arranged between a power supply 44 and a ground GND, includes six bridge-connected transistors 411 to 416 (which are FETs in the illustrated example). The transistors 411 to 416 are parallel-connected to diodes 411a to 416a in reverse directions, respectively. Also, the transistors 411, 412 and 413 are serially connected to the transistors 414, 415 and 416, respectively. Here, the transistors 411, 412 and 413 constitute an upper arm of the motor driving unit 41, whereas the other transistors 414, 415 and 416 constitute a lower arm of the motor driving unit 41.

The magnetic pole position detector 42 includes a sample-and-hold circuit 421, a low pass filter (LPF) 422, a comparator 423, and a DC power supply of a reference voltage Vr. The sample-and-hold circuit 421 has a switch 4211 and a capacitor 4212.

The controller 43 is provided with a command voltage generator 431, a drive signal generator 432, a command unit 433, an error amplifier 434, a triangular wave generator 435, a current detector 436, and a sample-and-hold signal generator 437.

The current detector 436 detects the magnitude of current flowing in the motor driving unit 41. A detection result from the current detector 436 is then outputted to the error amplifier 434 as a current detection signal CS. The command unit 433 generates a torque command signal EC that designates a torque to be applied to the brushless motor 10. The error amplifier 434 amplifies an error between a target current value obtained from the torque command signal EC and the current detection signal CS, then outputs an amplified error signal Va to the command voltage generator 431 and the sample-and-hold signal generator 437, respectively.

The sample-and-hold signal generator 437 receives the amplified error signal Va and a triangular signal Vtri generated by the triangular wave generator 435 to generate a timing pulse which indicates the timing of all the transistors 414 to 416 (which constitutes the lower arm of the motor driving unit 41) being ON, thereby outputting a sample-and-hold signal SH1 to the magnetic pole position detector 42.

The magnetic pole position detector 42 samples and holds a neutral voltage Vc of the brushless motor 10 in response to the signal level of the sample-and-hold signal SH1 to detect a magnetic pole position of the rotor magnet 23 by detecting a phase angle of an induced electromotive force generated at each phase U, V and W. The magnetic pole position detector 42 then outputs a position detection signal FG as a result of the detection to the command voltage generator 431.

The switch 4211 in the magnetic pole position detector 42 is opened or closed according to a signal level (H or L level) of the sample-and-hold signal SH1. If the sample-and-hold signal SH1 is at H level, the switch 4211 is closed to enter a connected state. Thus, the neutral voltage Vc of the brushless motor 10 is sampled by the capacitor 4212 (which is a sampling operation).

On the other hand, if the sample-and-hold signal SH1 is at L level, the switch 4211 is opened to enter an opened state. Thus, the capacitor 4212 holds the sampled voltage (which is a holding operation). Likewise, the sample-and-hold circuit 421 samples and holds the neutral voltage Vc of the brushless motor 10 according to the signal level of the sample-and-hold signal SH1, thereby outputting a sample-and-hold output signal VcSH1. Thus generated sample-and-hold output signal VcSH1 is inputted to the LPF 422. Then, the LPF 422 removes stepped edges from the sample-and-hold output signal VcSH1 to smooth the signal VcSH1, thereby outputting a smoothed signal VcSH2 to the comparator 423. The smoothed signal VcSH2 is applied to one input terminal of the comparator 423, and a reference voltage Vr of the power supply is input to the other input terminal thereof. The comparator 423 then generates a position detection signal FG that is a pulse signal.

The command voltage generator 431 generates three phase command voltages sinU, sinV and sinW of sinusoidal waveform based on the position detection signal FG from the magnetic pole position detector 42 and the amplified error signal Va. The three phase command voltages sinU, sinV and sinW differ from each other in phase by 120°, and each of them enables a current conduction in the entire 180° range of electrical angle. The command voltage generator 431 outputs the three phase command voltages to the drive signal generator 432. Using the three phase command voltages, the drive signal generator 432 outputs a drive signal to the transistors 411 to 416 in the motor driving unit 41.

Further, when all of the transistors 414 to 416 (which respectively correspond to the three phases U, V and W) are ON, the sample-and-hold output signal VcSH1 from the magnetic pole position detector 42 is equivalent to the superposition of 3Nth harmonic components (where N is a positive integer) contained in an induced electromotive force.

Because the sixth and the ninth harmonic component are extremely small compared to the third harmonic component, a voltage value of the sample-and-hold output signal VcSH1 is substantially equal to that of the third harmonic component. Therefore, an amplitude Na of the sample-and-hold output signal VcSH1 can be obtained by multiplying an amplitude A of fundamental wave component in the induced electromotive force with an amplitude ratio C of the third harmonic component to the fundamental wave component (in short, Na=A×C). If the amplitude of the sample-and-hold output signal VcSH1 is large, the magnetic pole position of the rotor can be detected with a high accuracy.

In the operations of the near-sinusoidal sensorless driving circuit 4, a non-conducting period does not exist. Accordingly, by using the near-sinusoidal sensorless driving circuit 4 for the brushless motor of the present preferred embodiment of the invention, it is possible to provide a low-vibration and low-noise brushless motor by eliminating the vibration and noise caused by the presence of the non-conducting period.

Detailed Configuration of Brushless Motor

Hereinafter, a configuration for improving the amplitude ratio of the third harmonic component to the fundamental wave component in the induced electromotive force of the brushless motor 10 in accordance with the present preferred embodiment, and a configuration for improving a variation in coil inductance will be described in detail with reference to FIGS. 4 to 8.

Figure 4:
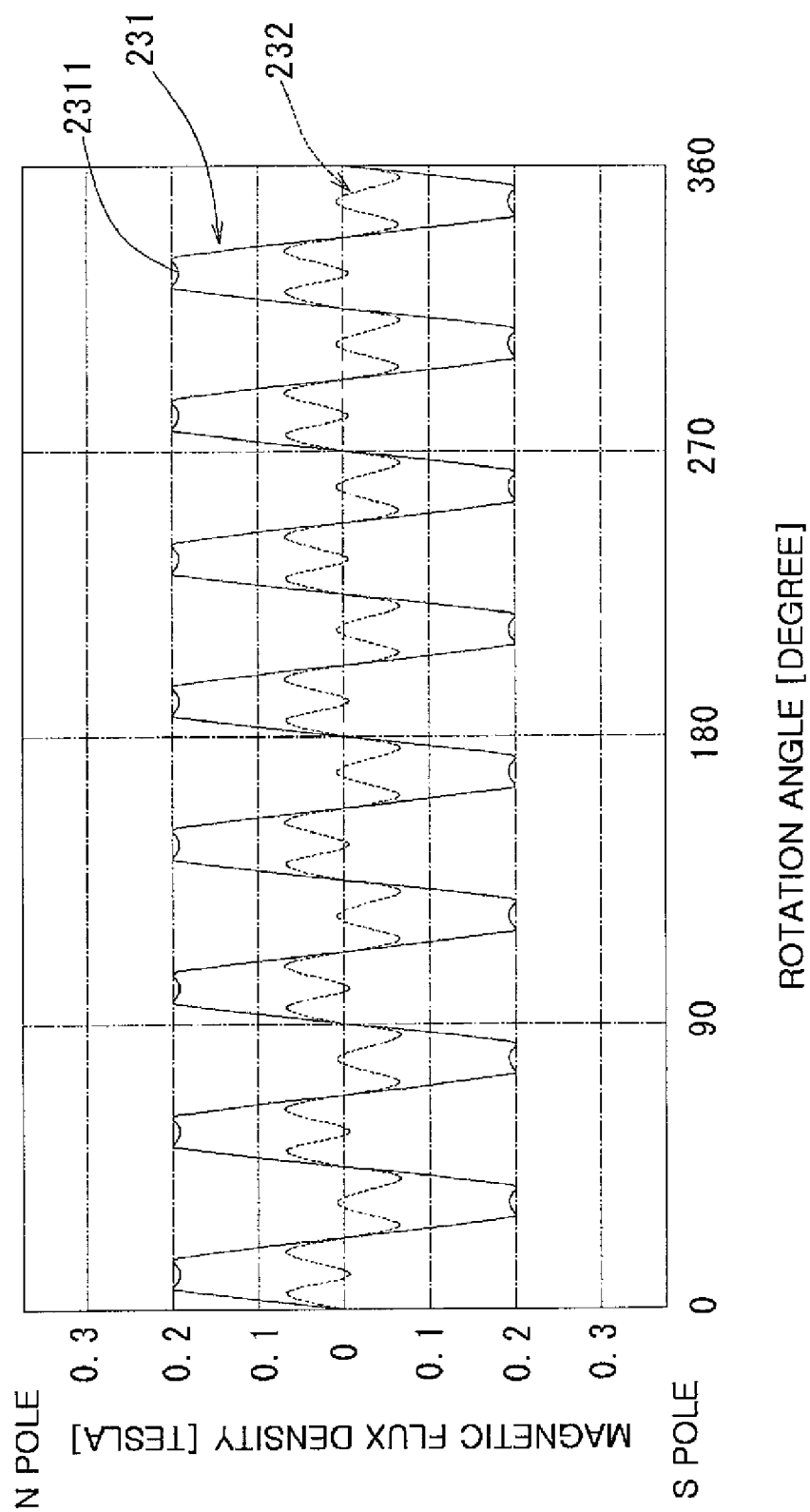
FIG. 4 is a graph showing a magnetic flux density of a rotor magnet in the brushless motor as a function of a rotation angle in accordance with a preferred embodiment of the present invention.
Figure 5:
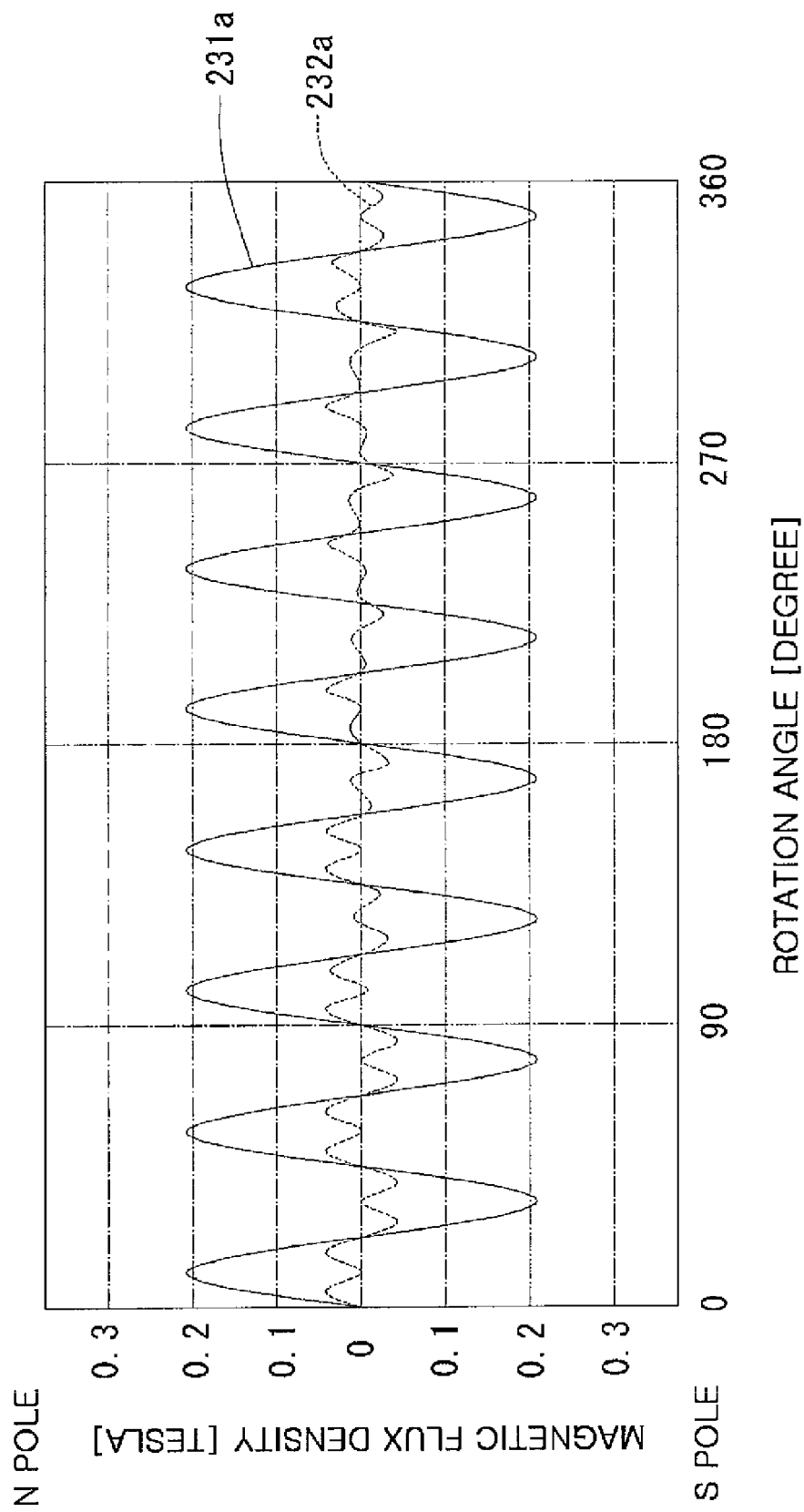
FIG. 5 is a graph showing a magnetic flux density of a rotor magnet in a first comparative example as a function of the rotation angle.
Figure 6:
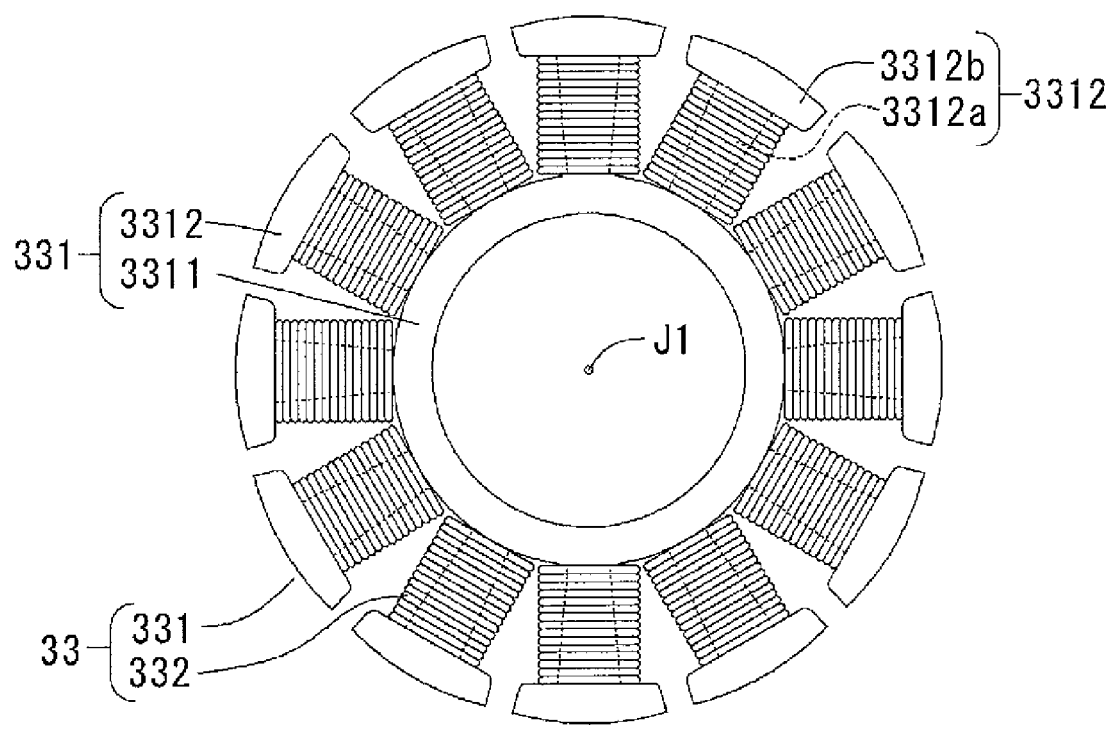
FIG. 6 is a top plan view showing a stator mounted on the brushless motor in accordance with a preferred embodiment of the present invention.
Figure 7:
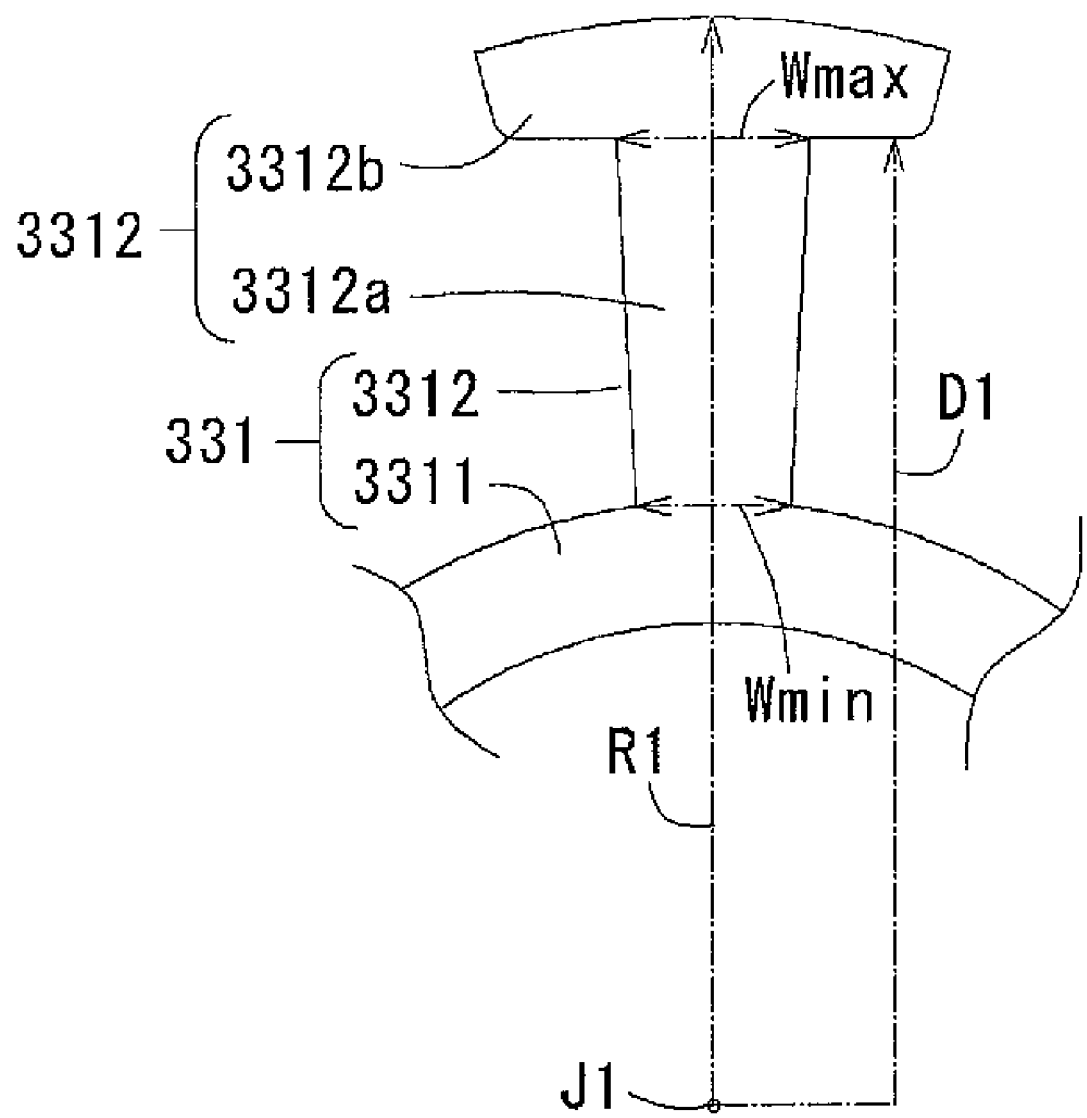
FIG. 7 is an enlarged view showing a portion of a stator core in the stator shown in FIG. 6.

Here, FIG. 4 is a graph showing a magnetic flux density of the rotor magnet 23 in the brushless motor 10 as a function of a rotation angle in accordance with a preferred embodiment of the present invention; FIG. 5 is a graph showing a magnetic flux density of a rotor magnet in a first comparative example as a function of the rotation angle; FIG. 6 is a top plan view showing the stator 33 mounted on the brushless motor 10 in accordance with a preferred embodiment of the present invention; FIG. 7 is an enlarged view showing a portion of a stator core in the stator 33; and FIG. 8 is a graph showing a coil inductance of the stator in accordance with a preferred embodiment of the present invention and that of a stator in a brushless motor in a second comparative example.

Figure 8:
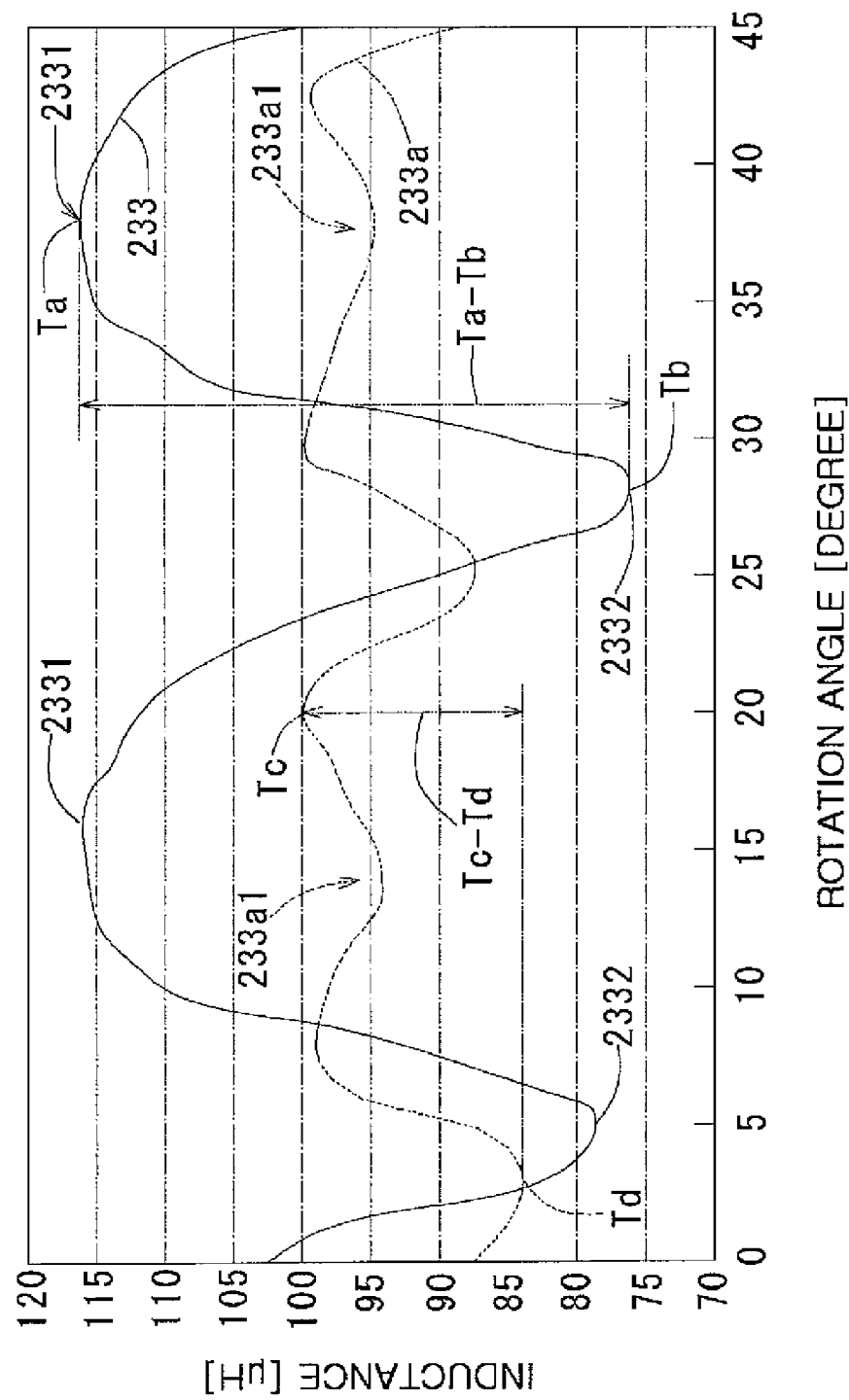
FIG. 8 is a graph showing a coil inductance of the stator in accordance with a preferred embodiment of the present invention and that of a stator in a brushless motor in a second comparative example.

The brushless motor in the first comparative example shown in FIG. 5 differs from that of the present preferred embodiment in that a different magnetizing method is used therefor; and the brushless motor in the second comparative example shown in FIG. 8 differs from that of the present preferred embodiment in that a tooth portion has a different shape in the stator therein.

In FIG. 4, a vertical axis represents a magnitude (in Tesla) of magnetic flux density, and a horizontal axis represents a rotation angle (in degree) with respect to the center axis J1.

A magnetic flux density waveform 231, which represents a magnetic density observed on a side surface (e.g., an inner peripheral surface) of the rotor magnet 23 as a function of a rotation angle, is a near-sinusoidal waveform (see the waveform represented by a solid line in FIG. 4). In other words, the rotor magnet is magnetized in such a manner that the magnetic flux density of the side surface thereof has a near-sinusoidal wave distribution when plotted as a function of the rotation angle.

Herein, each maximum or minimum point in the magnetic flux density waveform 231 approximately corresponds to a center of each magnetic pole of the rotor magnet 23. Further, a point where the magnetic flux density waveform 231 becomes zero approximately corresponds to a boundary region between two adjacent magnetic poles. At the vicinity of the maximum and minimum points in the magnetic flux density waveform 231 are formed concave portions 2311 that are convex toward zero. The waveform plotted by a dotted line in FIG. 4 represents a magnetic flux density waveform 232 of a third harmonic wave component.

Meanwhile, a magnetizer for magnetizing the rotor magnet as in the present preferred embodiment has recessed portions in a magnetizing portion that is to be arranged opposite the inner peripheral surface of the rotor magnet, wherein the recessed portions in the magnetizing portion are formed at locations corresponding to the centers of the magnetic poles of the rotor magnet. In detail, the magnetizing portion of the magnetizer is formed of a ring shape by arc-shaped outer peripheral areas of the magnetizing portion are arranged to be spaced apart from each other in a circumferential direction. The outer peripheral areas of the magnetizing portion are to be arranged opposite the inner peripheral surface of the rotor magnet via an air gap in a radial direction therebetween.

By forming the recessed portions in the magnetizing portion, the air gap in the radial direction between the magnetizing portion of the magnetizer and the inner peripheral surface of the rotor magnet varies between locations at the recessed portions and at the other portions in the magnetizing portion. Thus, the rotor magnet can be magnetized such that the magnetic flux density is different at corresponding positions.

Further, it is also possible to magnetize the rotor magnet by using, e.g., a magnetizer configured generally same as those shown in Japanese Patent No. 3599547 except that the number of recessed portions preferably is 16, for example. As such, it is possible to obtain the magnetic flux density waveform 231 of the rotor magnet 23 that includes concave portions 2311.

In FIG. 5, a vertical axis represents a magnitude (in Tesla) of magnetic flux density, and a horizontal axis represents a rotation angle (in degrees) with respect to the center axis J1.

A magnetic flux density waveform 231a, which represents a magnetic density observed on a side surface (e.g., an inner peripheral surface) of the rotor magnet in a brushless motor of the first comparative example as a function of a rotation angle, is a sinusoidal waveform (see the waveform represented by a solid line in FIG. 5). In other words, the rotor magnet is magnetized in such a manner that the magnetic flux density of the side surface thereof has a sinusoidal wave distribution when plotted as a function of the rotation angle. Herein, unlike the magnetic flux density of the rotor magnet 23 in the brushless motor 10 in the present preferred embodiment, there is no concave portion like 2311 in FIG. 4. The waveform plotted by dotted lines in FIG. 5 represents a magnetic flux density waveform 232a of a third harmonic wave component.

Referring to FIGS. 4 and 5, it can be seen that the magnitude of the magnetic flux density waveform 232 of the third harmonic component in case of the brushless motor 10 in the present preferred embodiment is larger than that of the magnetic flux density waveform 232a of the third harmonic component in case of the brushless motor in the first comparative example. Consequently, the amplitude ratio of the third harmonic component to the fundamental wave component in the induced electromotive force is approximately 0.43% in the brushless motor as the first comparative example, whereas the amplitude ratio of the above is increased to approximately 1.36% in the brushless motor 10 in the present preferred embodiment.

In the brushless motor of the present preferred embodiment, the rotor holder may have an outer diameter within a range of, for example, from about 26 mm to about 30 mm (in the above-described example of the present preferred embodiment, the outer diameter of the rotor holder 20 is about 26 mm). Further, a rotation speed of the brushless motor may be within a range of, for example, from about 40 rpm to about 7,000 rpm. In addition, the number of turns of the conductive wire in the coil wound around each tooth portion in the stator may be, for example, about between 20 and 100 (it is about 60 in the above-described example of the present preferred embodiment). Each conductive wire is wound around one of the tooth portion in the stator with the same number of turns. Further, a maximum value of the magnetic flux density of the rotor magnet is about 0.2 Tesla, for example.

It was discovered that, for stably driving the brushless motor under the above conditions, the amplitude ratio of the third harmonic component to the fundamental wave component in the induced electromotive force is preferably approximately 1% or higher. That is, if the amplitude ratio of the above is lower than approximately 1%, an operation error is likely to occur. More specifically, the brushless motor does not reach a target rotation speed, or the rotation speed of the brushless motor abruptly falls during its startup (that is, the brushless motor would not start up smoothly). For this reason, in the present preferred embodiment, the amplitude ratio of the third harmonic component to the fundamental wave component in the induced electromotive force of the present invention is preferably set higher than approximately 1% to avoid such problems. Thus, it is possible to provide a highly reliable brushless motor.

Referring to FIG. 6, the stator core 331 in the stator 33 includes a ring-shaped core-back portion 3311 formed to surround the center axis J1; and tooth portions 3312 (which are 12 in number in the illustrated example) extending from the core-back portion 3311 in the radially outward direction. Each of the tooth portions 3312 is wound by conductive wires with a plural number of turns to form one of the coils 332. In the present preferred embodiment, there are four U-phase coils, four V-phase coils, and four W-phase coils. The core-back portion 3311 and the tooth portions 3312 are formed as a united body.

Referring to FIG. 7, each of the tooth portions 3312 includes a base portion 3312a wound with conductive wires; and a widened portion 3312b located radially outward of the base portion 3312a. A circumferential width of the tooth portion 3312b is greater than that of the base portion 3312a.

Further, the circumferential width of the base portion 3312a increases in the radially outward direction. The widened portion 3312b includes an inner surface substantially normal to the radially extending direction of the base portion 3312, and an outer peripheral surface arranged to radially face the inner peripheral surface of the rotor magnet 23 (see FIG. 1). Meanwhile, the diametrical width of the widened portion 3312b decreases toward both side ends away from the circumferential center.

In the following, an outermost diameter of the tooth portion 3312 measured from the center axis J1 is defined as R1; a distance between the center axis J1 to the inner surface of the widened portion 3312b is defined as D1; a maximum value of the circumferential width of the base portion 3312a is defined as Wmax; and a minimum value of the circumferential width of the base portion 3312a is defined as Wmin.

The tooth portion 3312 is shaped such that a ratio of D1 to R1 (i.e., D1/R1) preferably falls within a range from about 0.85 to about 0.92, and a ratio of Wmin to Wmax (i.e., Wmin/Wmax) falls within a range from about 0.7 to about 0.8, for example.

Further, each tooth portion of the stator in the second comparative example preferably satisfies the conditions of $0.93 \leq D1/R1 \leq 1$ and $0.6 \leq Wmin/Wmax < 0.7$, for example.

In a graph of FIG. 8, the vertical axis represents a magnitude of coil inductance (μH) and the horizontal axis represents the rotation angle (in degrees) of the rotor magnet 23.

A coil inductance waveform 233, which depicts a coil inductance in the brushless motor 10 in the present preferred embodiment as a function of the rotation angle, is a near-sinusoidal waveform (see the waveform plotted by a solid line in FIG. 8). A peak 2331 of an upwardly convex portion in the coil inductance waveform 233 approximately corresponds to the boundary region between two adjacent magnetic poles in the rotor magnet 23; and a peak 2332 of a downwardly convex portion in the coil inductance waveform 233 approximately corresponds to the center of a magnetic pole in the rotor magnet 23.

In the coil inductance waveform 233, a portion of the waveform ranging from the center of a magnetic pole in the rotor magnet 23 to the center of a circumferentially adjacent magnetic pole (i.e., a portion of the waveform between two adjacent minimum points Tb in the coil inductance waveform 233) forms an approximately inverse U-shaped curve. Here, a maximum point Ta in the coil inductance waveform 233 represents a maximum value of the coil inductance waveform 233 within a range of one rotation of the rotor magnet 23 (i.e., mechanical angle of 360 degrees). Likewise, the minimum point Tb in the coil inductance waveform 233 represents a minimum value of the coil inductance waveform 233 within a range of one rotation of the rotor magnet 23 (i.e., mechanical angle of 360 degrees).

Since the coil inductance waveform 233 is of an inverse U-shape, a difference Ta−Tb between the maximum value Ta and the minimum value Tb can be increased. The difference Ta−Tb, which is a variation (amplitude) in the coil inductance, is approximately proportional to a variation (amplitude) in the induced electromotive force. Therefore, by increasing the variation (amplitude) in the coil inductance, a variation (amplitude) in the induced electromotive force can be increased, and accordingly the amplitude of the third harmonic component in the induced electromotive force can be increased.

On the other hand, a coil inductance waveform 233a (indicated by a dotted line in FIG. 8) that depicts a coil inductance in a brushless motor in the second comparative example as a function of the rotation angle is not a near-sinusoidal waveform. Instead, concave portions 233a1 exist in the coil inductance waveform 233a in boundary regions between two adjacent magnetic poles of the rotor magnet. Because of the existence of the concave portions 233a1, the coil inductance waveform 233a does not have a maximum value in a boundary region between two adjacent magnetic poles of the rotor magnet, and has two maximum values in one magnetic pole of the rotor magnet. Hence, there is a possibility that, in the coil inductance waveform 233a, two boundary regions are erroneously detected in one magnetic pole of the rotor magnet.

Further, it can be seen from FIG. 8 that, because of the existence of the concave portions 233a1, a difference Tc−Td between a maximum value Tc and a minimum value Td of the coil inductance waveform 233a is decreased noticeably as compared with the coil inductance waveform 233 in the brushless motor 10 of the present preferred embodiment. Here, the maximum value Tc of the coil inductance waveform 233a corresponds to a maximum value of the coil inductance waveform 233a within a range of one rotation of the rotor magnet (i.e., mechanical angle of 360 degrees). Likewise, the minimum value Td of the coil inductance waveform 233a corresponds to a minimum value of the coil inductance waveform 233a within a range of one rotation of the rotor magnet (i.e., mechanical angle of 360 degrees).

As such, the induced electromotive force in the brushless motor in the second comparative example has a small amplitude. For this reason, a problem may arise in that the brushless motor does not operate stably. In other words, if the tooth portion is shaped such that D1/R1 is greater than about 0.92, the coil inductance waveform 233a has the concave portions 233a1, making it difficult to stably operate the brushless motor. Further, if the value of Wmin/Wmax is greater than about 0.7, the coil inductance waveform 233a is more likely to form the concave portions 233a1. Consequently, it becomes more difficult to operate the brushless motor stably.

It was discovered that the brushless motor can be operated stably if a percentage value of (Tc−Td)/Tc (i.e., a rate of variation in the coil inductance) is about 10% or higher. Based thereon, it is possible to increase the amplitude of the induced electromotive force in the brushless motor, and therefore, the amplitude of the third harmonic component contained therein as well.

With the magnetic flux density waveform 231 and the coil inductance waveform 233 of the rotor magnet 23 in the present preferred embodiment, the amplitude ratio of the third harmonic component to the fundamental wave component in the induced electromotive force can be improved while increasing the amplitude of the induced electromotive force in the brushless motor 10. Thus, an amplitude of the sample-and-hold output signal VcSH1 (see FIG. 3) can also be increased. Therefore, the magnetic pole position detector 42 (see FIG. 3) in the near-sinusoidal sensorless driving circuit 4 can detect a magnetic pole position of the rotor magnet 23 with a much higher accuracy. As a result, the brushless motor can be stably operated by using the near-sinusoidal sensorless driving circuit having less vibration and noise than in a sensorless driving circuit in accordance with a wide angle conduction scheme. Thus, an operation error in the brushless motor can be suppressed.

Further, in a case of drawing pictures or characters on a label side opposite to a record side of an optical disk, the brushless motor 10 needs to be rotated at approximately 40 rpm. In this case, the amplitude of the induced electromotive force in the brushless motor 10 becomes smaller than that at a typical rotation speed (several thousands of rpm). However, with the magnetic flux density waveform 231 and the coil inductance waveform 233 in the rotor magnet 23 of the present preferred embodiment, the amplitude ratio of the third harmonic component to the fundamental wave component in the induced electromotive force can be enhanced while keeping the amplitude of the induced electromotive force to be large. Therefore, the magnetic pole position detector 42 in the near-sinusoidal sensorless driving circuit 4 can detect a magnetic position of the rotor magnet 23 with higher accuracy.

Overall Configuration of Disk Driving Apparatus

Hereinafter, a disk driving apparatus in accordance with a preferred embodiment of the present invention will be explained with reference to FIG. 9, which is a schematic cross-sectional view of the disk driving apparatus taken in an axial direction.

Figure 9:
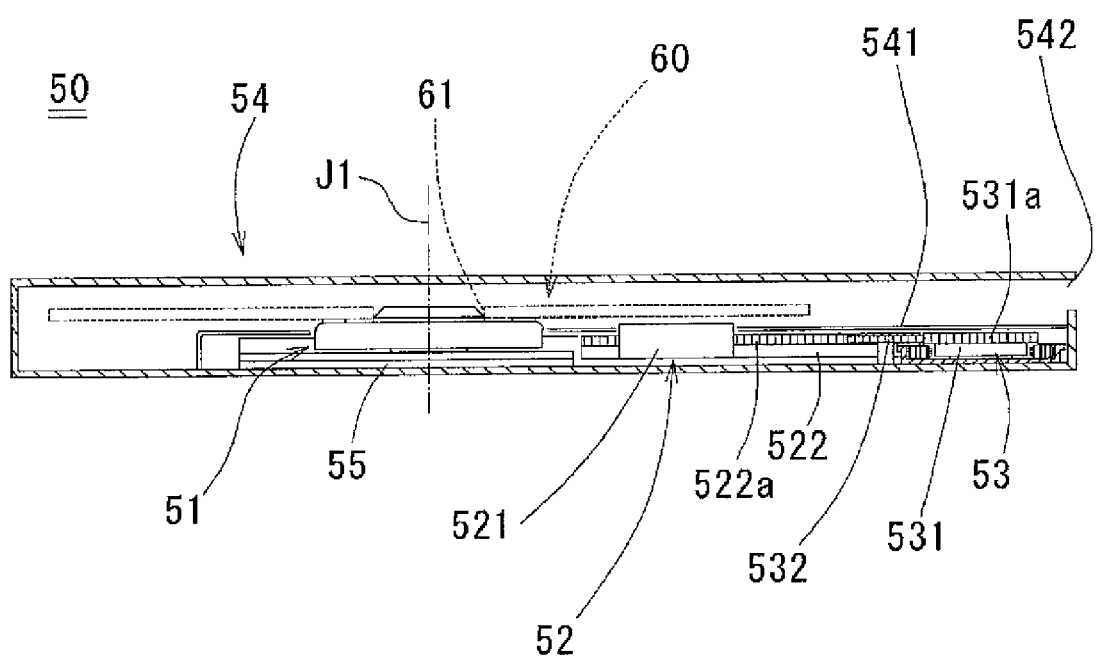
FIG. 9 is a schematic cross-sectional view of a disk driving apparatus taken in an axial direction in accordance with a preferred embodiment of the present invention.

As shown in FIG. 9, a disk driving apparatus 50 includes a spindle motor 51 capable of being inserted into a central opening 61 of a disk 60 to thereby align the disk 60 coaxially with a center of rotation, and rotating the disk 60 about a center axis J1; an optical pickup mechanism 52 which emits light onto the disk 60, and receives a reflected beam therefrom; a moving mechanism 53 which moves the optical pickup mechanism 52 in a radial direction of the disk 60; and a housing body 54 for accommodating the above-described components.

The spindle motor 51 and the optical pickup mechanism 55 are held by a chassis 55. By moving at least the chassis 55 in an axial direction, the central opening 61 of the disk 60 is fixed to a chucking device for the spindle motor 51. Further, the chassis 55 has an opening, in which the optical pickup mechanism 52 is installed.

The moving mechanism 53 is provided with a motor 531 having a gear on an output shaft, and a driven gear 532 to which a rotation torque is transmitted from the motor 531.

The housing body 54 has a partition plate 541 made of sheet metal for separating the disk 60 in motion from the moving mechanism 53; and an opening 542 which the disk 60 is inserted into or withdrawn from.

The pickup mechanism 52 is provided with a light emitting/receiving portion 521 which emits light such as a laser beam, and receives a reflected beam from the disk 60; and a moving portion 522 disposed perpendicular or substantially perpendicular to a moving direction that is the radial direction of the disk 60, which moves the light emitting/receiving portion 521. The moving portion 522 has an engagement portion 522a engaged with the driven gear 532. Thus, the light emitting/receiving portion 521 moves in the radial direction by being engaged with the moving portion 522.

The engagement of a gear portion 531a attached to the motor 531 with the driven gear 532 makes the driven gear 532 spin, and the engagement of the driven gear 532 with the engagement portion 522a in the moving portion 522 makes the moving portion 522 rotate in the radial direction. As the moving portion 522 is rotated, the light emitting/receiving portion 521 is moved in the radial direction.

By using the brushless motor 10 according to a preferred embodiment of the present invention for the spindle motor 51 in the disk driving apparatus 50, vibration and noise are reduced while preventing operational errors of the brushless motor 10, thereby driving an optical disk stably. Thus, a high-reliability disk driving apparatus of reduced vibration and noise can be provided while preventing errors in recording and playing.

In the above, the present invention has been described with respect to particular preferred embodiments of the brushless motor and the disk driving apparatus. However, the present invention is not limited thereto, and various modifications can be made.

Although the brushless motor 10 described above has been described as a spindle motor for rotating an optical disk such as a CD or DVD, the present invention is not limited thereto, and may also be applied to a brushless motor mounted on office equipment, a vehicle, etc.

Further, although the brushless motor 10 described above has been described as including the near-sinusoidal sensorless driving circuit 4, a near-sinusoidal sensorless driving circuit of the present invention is not limited thereto.

Further, in the above description, a third harmonic component is reinforced for an induced electromotive force of the brushless motor 10 by forming the concave portion 2311 at the center of a pole of the magnetic flux density waveform 231 of the rotor magnet 23. However, the present invention is not limited thereto, and a third harmonic component may also be reinforced by, e.g., arranging the tooth portions of the stator core in a circumferential direction at varied intervals.

Further, although in the above description the near-sinusoidal sensorless driving circuit 4 is disposed on the circuit board 35 of the brushless motor 10, the present invention is not limited thereto. For instance, the near-sinusoidal sensorless driving circuit 4 may be disposed on another circuit board separate from the circuit board 35 of the brushless motor 10; or both of the circuit board 35 and another circuit board may be used for the near-sinusoidal sensorless driving circuit 4.

Furthermore, in the above description, the chucking device 24 of the brushless motor 10 preferably includes the coil springs 242 and the chuck claws 243. However, the present invention is not limited thereto, and, for example, the chucking device may be a center casing including aligning claws for aligning a disk but not necessarily including the coil springs 242 and/or the chuck claws 243. In addition, the coil springs 242 may be replaced with an elastic member that can apply a force to the chuck claws 243 in the radially outward direction. Further, the chuck claws 243 are not limited to the configuration illustrated in the preferred embodiments of the present invention, but may take any form as long as they can hold a disk.

While the present invention has been shown and described with respect to preferred embodiments thereof, it will be understood by those skilled in the art that various changes and modification may be made without departing from the scope of the present invention as defined in the following claims.

What is claimed is:

1. A brushless motor comprising:
   a sensorless driving circuit arranged to drive the motor;
   a rotating body capable of being rotated about a center axis;
   a rotor magnet arranged coaxially with the rotating body;
   a stator disposed opposite to the rotor magnet; and
   at least one coil wound around the stator; wherein
   the sensorless driving circuit is configured to drive the brushless motor according to a signal containing a third harmonic component relative to a fundamental wave component in an induced electromotive force;
   an amplitude ratio of the third harmonic component to the fundamental wave component in the induced electromotive force generated in the coil is about 1% or higher; and
   a rate of variation of a coil inductance equal to a ratio of a difference between a maximum coil inductance value and a minimum coil inductance value to the maximum coil inductance value is about 10% or higher.

2. The brushless motor of claim 1, wherein a magnetic flux density on a side surface of the rotor magnet is distributed in a near-sinusoidal waveform with respect to a rotation angle, the near-sinusoidal waveform having a concave portion at a center of a magnetic pole.

3. The brushless motor of claim 1, wherein
   the stator includes tooth portions extending in a radial direction with respect to the center axis, and arranged at a regular interval in a circumferential direction;
   each of the tooth portions has a widened portion arranged opposite to the rotor magnet, and a base portion extending from the widened portion in a radially inward direction;
   the widened portion includes a counter surface having a circumferential width that is larger than that of the base portion, and an inner surface arranged radially opposite the counter surface and extending from a side surface of the base portion; and
   a ratio of D1 to R1 is about 0.92 or smaller, R1 being a distance between the center axis and a position of the counter surface closest to the rotor magnet, and D1 being a distance between the center axis and the inner surface.

4. The brushless motor of claim 3, wherein the circumferential width of the base portion varies along the radial direction, and a ratio of Wmin to Wmax is about 0.7 or larger, Wmax being a maximum circumferential width of the base portion, and Wmin being a minimum circumferential width of the base portion.

5. The brushless motor of claim 1, wherein the rotating body includes:
   a disk support portion on which a disk having a central opening is mounted; and
   a chucking device configured to enable the disk to be attached thereto and detached therefrom.

6. A disk driving apparatus, equipped with the brushless motor of claim 5, capable of driving a disk, comprising:
   an optical pickup mechanism configured to emit and receive light to and from the disk; and
   a moving mechanism configured to move the optical pickup mechanism in a radial direction of the disk.

7. The brushless motor of claim 1, wherein the sensorless driving circuit is disposed on a circuit board that defines at least a portion of the rotating body.

8. A brushless motor, comprising:
 a rotating body having a rotor magnet arranged coaxially with a center axis, capable of being rotated about the center axis; and
 a fixed body having a stator disposed opposite to the rotor magnet and a sensorless driving circuit configured to control a rotation of the rotating body by controlling a current conduction in a coil in the stator; wherein
 the sensorless driving circuit includes:
  a position detector configured to detect a position of the rotating body based on an induced electromotive force generated in the coil by the rotor magnet rotating about the stator;
  a controller configured to control a conduction timing according to the detected position of the rotating body received from the position detector; and
  a motor driving unit configured to convert a current conduction in the coil in response to a control signal from the controller; wherein
 the position detector is arranged to detect a position of the rotating body using a signal containing a third harmonic component relative to a fundamental wave component in the induced electromotive force;
 an amplitude ratio of the third harmonic component to the fundamental wave component in the induced electromotive force is about 1% or higher; and
 a rate of variation of a coil inductance equal to a ratio of a difference between a maximum coil inductance value and a minimum coil inductance value to the maximum coil inductance value is about 10% or higher.

9. The brushless motor of claim 8, wherein a magnetic flux density on a side surface of the rotor magnet is distributed in a near-sinusoidal waveform with respect to a rotation angle, the near-sinusoidal waveform having a concave portion at a center of a magnetic pole.

10. The brushless motor of claim 8, wherein the stator includes tooth portions extending in a radial direction with respect to the center axis, and arranged at a regular interval in a circumferential direction;
 each of the tooth portions has a widened portion arranged opposite to the rotor magnet, and a base portion extending from the widened portion in a radially inward direction;
 the widened portion includes a counter surface having a circumferential width that is larger than that of the base portion, and an inner surface arranged radially opposite the counter surface and extending from a side surface of the base portion; and
 a ratio of D1 to R1 is about 0.92 or smaller, R1 being a distance between the center axis and a position of the counter surface closest to the rotor magnet, and D1 being a distance between the center axis and the inner surface.

11. The brushless motor of claim 10, wherein the circumferential width of the base portion varies along the radial direction, and a ratio of Wmin to Wmax is about 0.7 or larger, Wmax being a maximum circumferential width of the base portion, and Wmin being a minimum circumferential width of the base portion.

12. The brushless motor of claim 8, wherein the sensorless driving circuit is disposed on a circuit board that defines at least a portion of the rotating body.

13. The brushless motor of claim 8, wherein the rotating body includes:
 a disk support portion on which a disk having a central opening is mounted; and
 a chucking device configured to enable the disk to be attached thereto and detached therefrom.

14. A disk driving apparatus, equipped with the brushless motor of claim 13, capable of driving a disk, comprising:
 an optical pickup mechanism configured to emit and receive light to and from the disk; and
 a moving mechanism configured to move the optical pickup mechanism in a radial direction of the disk.

* * * * *